United States Patent [19]

Buch et al.

[11] Patent Number: 5,303,382
[45] Date of Patent: Apr. 12, 1994

[54] ARBITER WITH PROGRAMMABLE DYNAMIC REQUEST PRIORITIZATION

[75] Inventors: Bruce D. Buch, Westborough; Cecil D. MacGregor, Milford, both of Mass.

[73] Assignee: Digital Equipment Corporation, Maynard, Mass.

[21] Appl. No.: 975,127

[22] Filed: Nov. 12, 1992

Related U.S. Application Data

[63] Continuation of Ser. No. 410,615, Sep. 21, 1989, abandoned.

[51] Int. Cl.$^5$ ............................................. G06F 13/14
[52] U.S. Cl. .............................. 395/725; 364/DIG. 1; 364/242.6; 364/242.8; 364/244.9
[58] Field of Search ................................ 395/425, 725

[56] References Cited

U.S. PATENT DOCUMENTS

| | | | |
|---|---|---|---|
| 4,271,467 | 6/1981 | Holtey | 395/425 |
| 4,814,974 | 3/1989 | Narayanan et al. | 395/725 |
| 5,016,162 | 5/1991 | Epstein et al. | 364/200 |

Primary Examiner—Debra A. Chun
Attorney, Agent, or Firm—Arnold, White & Durkee

[57] ABSTRACT

Methodology and circuitry for providing adaptable dynamic prioritization of a plurality of requestors for a shared resource with a plurality of prioritization commands selected according to the winning request of each arbitrage operation.

7 Claims, 4 Drawing Sheets

ARBITER WITH PROGRAMMABLE DYNAMIC REQUEST PRIORITIZATION

This application is a continuation of application Ser. No. 07/410,615, filed Sep. 21, 1989, now abandoned.

FIELD OF THE INVENTION

The present invention relates to arbiter prioritization for a shared resource in a data processing system, and more particularly to methodology and circuitry for providing adaptable dynamic prioritization of a plurality of requestors for a shared resource in a data processing system.

BACKGROUND OF THE INVENTION

An arbiter controls the granting of a shared resource, such as a memory resource, among a number of requestors, such as central processing units (CPU's), in a data processing system in which all contend for the shared resource. Arbiters according to the prior art typically implement static prioritization policies. One class of arbiters employs a fixed priority. With such fixed priority arbiters, the requesting priority of a request made by one of the requestors is determined by the particular input of the arbiter on which the request is signaled. Different inputs of these arbiters correspond to different levels of priority. A disadvantage of such fixed priority arbiters is the resulting asymmetric utilization among the different requestors. Under conditions of heavy contention, it is possible for the lower priority requestors to be denied usage of the shared resource for extended periods.

Another class of prior art arbiters employ a prioritization policy called "round robin." With such a round robin priority arbiters, the priority of requests is rotated among the different requestors. This is advantageous where the requirements of all the requestors are substantially the same, since it provides a policy of fairness in which all the requestors are granted the same amount of utilization of the shared resource by all of the requestors with the same request latency over time. However, this fairness may be detrimental when different requestors have greater sensitivity to request latency and resource utilization than others.

Although it is possible to combine a conventional round-robin arbiter with a conventional fixed priority arbiter to provide an arbiter with a mixture of the two types of inputs, such a combinational arbiter is still limited to coupling a specific number of request inputs to specific arbitration policies.

SUMMARY OF THE INVENTION

The present invention overcomes the limitations of the prior art arbiter systems with methodology and circuitry for a single arbiter which can be programmed to define a number of dynamically alterable request prioritization policies. These policies include fixed priority levels, LRU round-robin priority, requestor priorities that change based on the previous winner of the arbitrated resource, and mixtures thereof.

Each requestor in the system is identified by a corresponding requestor ID (RID). The RID's are stored in a priority bin array. The RID's stored in the priority bin array have their priorities shifted by a bin shuffler which changes the bin priorities in accordance with programmed priority templates selected by a template selector in response to each winning RID. The priority bin array is coupled to a request prioritizor and selector which enables the selection of the highest priority request established by the priority bin array. Consequently, the priority of requests can be dynamically changed between the different requestors according to the selections of the programmed templates.

DETAILED DESCRIPTION OF THE PREFERRED EMBODIMENT

Figure 1:
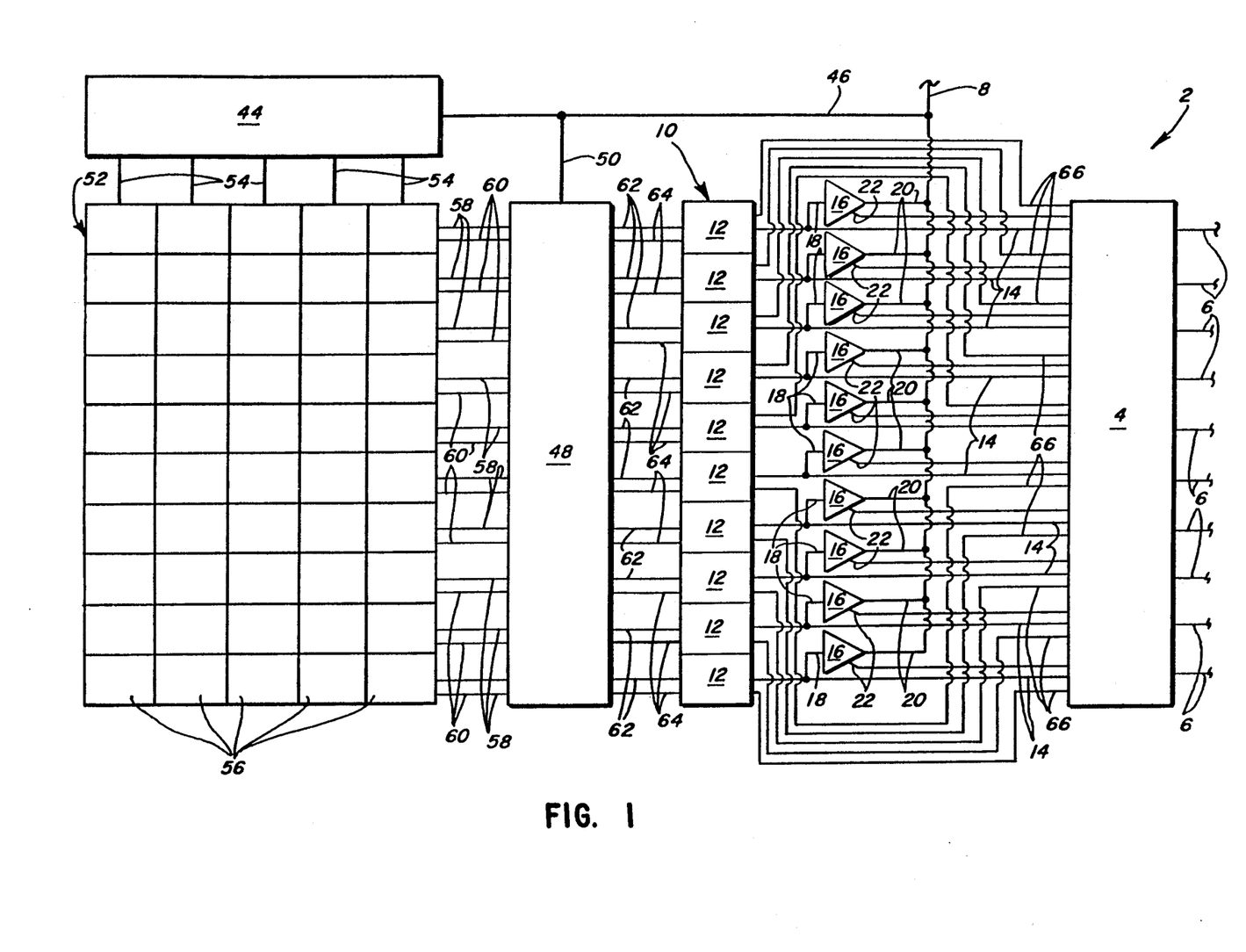
FIG. 1 is a block diagram of a preferred embodiment of the invention.

Referring to the drawings, wherein like characters designate like or corresponding parts throughout the views, FIG. 1 is a block diagram for the preferred embodiment of a programmable arbiter system 2. The arbiter system 2 receives input request signals into a request prioritizor and selector (RPS) 4 via request input line 6. Although ten request inputs to the RPS 4 via ten of the request input lines 6 are shown, any desired number of request inputs with corresponding input lines 6 can be used, so long as there are at least as many request inputs and input lines 6 as there are requestors (not shown) interfacing with the arbiter system 2.

Each requestor which interfaces to the system 2 is assigned a unique requestor ID (RID). The output of the system is an encoded grant ID signal on a grant ID bus 8. A priority bin array 10 includes a plurality of priority bins 12 for storing each one of the RID's according to the assigned priority of the corresponding requestor in ascending order. Thus, regardless of the numerical value of any RID, the RID in the first priority bin 12 has highest assigned priority and the RID in the last priority bin 12 has the lowest assigned priority.

Each of the priority bins 12 comprise a storage register which contains an RID. Each of the priority bins 12 has a priority bin output for supplying an RID output signal to a corresponding RID input on the RPS 4 via a priority bin output line 14. Each of the priority bins 12 has a corresponding output gate 16, with the input of each gate coupled to the output of each corresponding output bin 12 on the corresponding one of the lines 14 via one of a plurality of gate input lines 18. The output of each of the gates 16 feeds the grant ID bus 8 via one of a plurality of gate output lines 20. Each of the gates 16 is enabled to allow the RID output signal on the line 18 to pass to the grant ID output bus via a corresponding one of the lines 20, when the RPS 4 provides a corresponding enable signal to a gate enable input on an enable line 22.

The RPS 4 examines the RID's from each of the priority bins 12 sent to the RPS 4 via the lines 14 and the request signals from the requestors on the RPS input lines 6. The RPS 4 finds and selects the lowest numbered priority bin 12 which supplies an RID on its corresponding one of the lines 14 which matches the RID of one of the asserted request signals on one of the RPS input lines 6. The RPS 4 then outputs an enable signal on the one of the gate enable input lines 18 which feeds the one of the priority bin output gates 16 which corresponds to the priority bin 12 containing the RID which the RPS 4 has selected. This lets the RID output signal pass through the output gate 16 to the grant ID output bus via the gate output line 20. The RID output signal on the grant ID output bus 8 signifies the "winner" of the different requestors which have sent requests to the RPS 4 via the RPS input lines 6.

Figure 2:
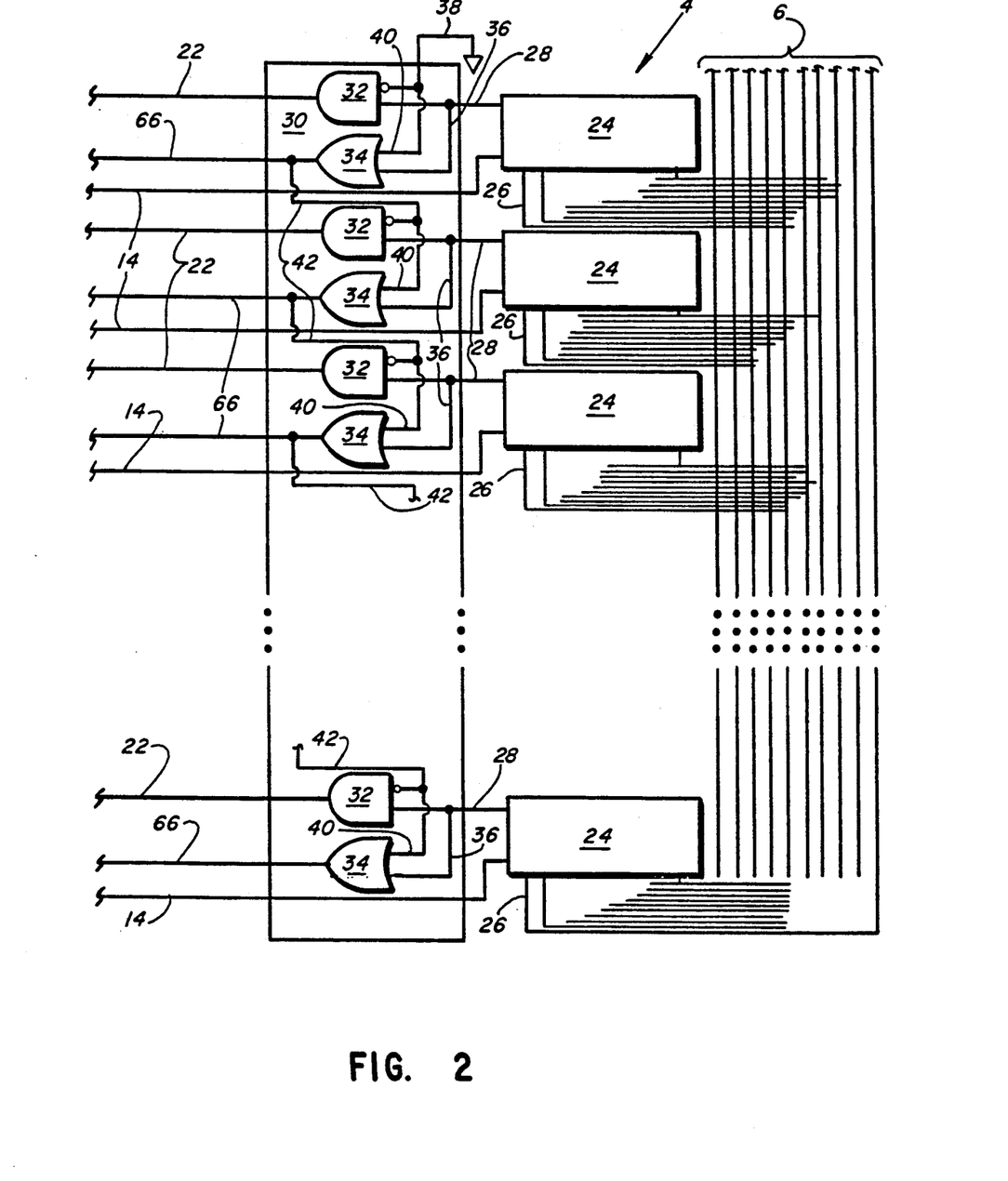
FIG. 2 is a block diagram of the request prioritizor and selector shown in FIG. 1.

The RPS 4 is shown in detail in FIG. 2. Each of the RPS input lines 6 feeds a different one of a plurality of inputs of each one of a plurality of single output multiplexers 24 via multiplexer input lines 26. There is one of the multiplexers 24 for each of the priority bins 12, and each of the multiplexers 24 has inputs from each of the RPS input lines 6. In this case, there are ten multiplexers 24 with ten inputs each. Each of the multiplexers 24 has a select input fed from the RID output signal of its corresponding priority bin 12 via the corresponding one of the lines 14. The select input of each of the multiplexers 24 selects one of the multiplexer inputs with a request signal on the corresponding line 6 which has a RID corresponding to the RID output signal of the priority bin 12 on the line 14. Each of the multiplexers 24 feeds its selected request signal on a multiplexer output via output line 28, which is one of a plurality of output lines 28. Each of the multiplexer output lines 28 are fed into a well known "kill-chain" circuit 30. The kill chain circuit 30 gives ascending priority to each of the multiplexers 24 from the first to the last. A serial arrangement is shown for the kill-chain 30 in FIG. 2, although other arrangements, such as a parallel kill chain, can be used as well. A kill chain using well-known look-ahead techniques can also be used to decrease propagation delay.

In the serial arrangement for the kill chain 30 shown in FIG. 2, each of the multiplexer output lines 28 feeds a non-inverted input of a two input AND gate 32. Each of the AND gates 32 also has an inverted input. The output of each corresponding AND gate 32 has an output feeding one of the enable lines 22 to supply an enable signal to one of the priority bin output gates 16. Each of the multiplexer output lines 28 also feeds one input of a two input OR gate 34 via one of a plurality of a first OR input lines 36. The first of the AND gates 32 having its non-inverted input fed from the corresponding one of the output lines 28 from the first of the multiplexers 24 has its inverted input held at a "0" state level. In FIG. 2, this is shown by the inverted input being coupled to circuit ground via an inverted input line 38.

The first of the OR gates 34 having its first input connected to the output line 28 of the first of the multiplexers 24 via a corresponding one of the lines 36 has its second input held at the "0" state by being coupled to circuit ground via an OR gate second input line 40. In this way, an output signal from the first of the multiplexers 24 on the corresponding one of the lines 28 is transmitted through the first of the AND gates 32 to produce a first enable signal on the corresponding one of the lines 22 to the first of the enable gates 16. Likewise, the output signal from the first of the multiplexers 24 on the line 36 is transmitted through the first of the OR gates 34 to produce a corresponding OR gate output signal on one of a plurality of OR gate output lines 42. The OR gate output signal on the corresponding one of the lines 42 is fed to the inverted input of the second of the AND gates 32, and to the second input of the second of the OR gates 34 via one of a plurality of OR gate second input lines 40. When the output of the first of the multiplexers 24 on the corresponding one of the lines 28 goes to the "1" state, the first of the AND gates 32 produces a "1" state output signal on the corresponding line 22, which enables the first of the priority bin output gates 16. The "1" state on its line 22 also produces a "1" state on the output signal line 42 of the first of the OR gates 34, which blocks the output of the second one of the AND gates 32 and produces a "1" state output on the output of the second of the OR gates 34 on its corresponding one of the OR gate output lines 42. Thus, the output signal of the first of the OR gates 34 serves as a first "kill" signal to block the output of the second of the multiplexers 24. Likewise, the output of the second of the OR gates 34 serves as a second "kill" signal to block the output of the third of the multiplexers 24. The outputs of each of the OR gates 34 in turn produce kill signals which block the outputs of the following ones of the multiplexers 24 by operation of their corresponding ones of the AND gates 32. As described above, each of the OR gates 34 passes on a "1" state, or "kill", to the next lower priority "stage" of the kill chain 30 if the stage of the OR gate 34, or a higher priority stage, has an active request.

Referring back to FIG. 1, the "winning" RID is output on the grant ID output bus 8. This RID output signal is also fed to the input of a template selector 44 via an input line 46 and a bin shuffler 48 via an input line 50. The template selector 44 controls the selecting of a re-order template 56 from array 52 via a plurality of template select lines 54. Each template select line 54 controls a different template 56 in the template array 52. Each of the templates 56 is a storage register with a programmable array of commands for the priority bins 12 in the priority bin array 10 which indicates how the contents of each of the priority bins 12 is to be altered in preparation for the next instance of request arbitration.

The template array 52 includes a sufficient number of the templates 56 to provide the desired number of dynamic programmed prioritization shifts. In FIG. 1, five of the templates 56 are shown for purposes of illustration, although a greater or lesser number can be included in the template array 52. Each of the templates 56 provides a plurality of bin command signals from the template array 52 which are fed to bin command inputs on the bin shuffler 48 via a plurality of bin command lines 58. One of the bin command lines 58 is provided for each one of the priority bins 12 in the priority bin array 10. The bin shuffler 48 re-orders the RID's stored in each of the priority bins 12 as per the bin command signals received from the template array 52 on the lines 58. A plurality of specific or literal RID signals are fed to the bin shuffler 48 from the template array 52 via literal RID lines 60. Each of the literal ID lines provides an RID for a different one of the bins 12 in the priority bin array 10 for initialization and general alteration. The command set implemented by the bin shuffler 48 is shown in Table 1. The command signals on the lines 58 have binary digital values which are arbitrarily assigned to represent the corresponding command. Each of these different command signals are shown in Table 1 with mnemonic names.

TABLE 1

| Mnemonic | Bin Shuffler Action at Bin "N" | Example of Usage |
| --- | --- | --- |
| NC (no change) | Bin contents are unaltered | |
| L# (literal) | Literal RID value stored with command is put into bin | Initialization and general alteration |

TABLE 1-continued

| Mnemonic | Bin Shuffler Action at Bin "N" | Example of Usage |
| --- | --- | --- |
| W (Winner) | Winner of last arbitration is stored into bin. | LRU Round Robin |
| N+1 | Contents of bin "N+1" is stored into bin "N" if bin "N" is of lower or equal priority than last winner | LRU Round Robin |

The bin shuffler 48 has a plurality of bin shuffler inputs for receiving the RID values of each of the priority bins 12 via a plurality of bin shuffler input lines 62 after each arbitrage operation. The bin shuffler 48 has a plurality of bin shuffler outputs for replacing the RID values of each of the priority bins 12 via a plurality of bin shuffler output lines 64. These values are replaced according to the commands of the template array 52 for each new arbitrage operation. The bin shuffler 48 also has a plurality of kill signal inputs for receiving kill signals from the RPS 4 corresponding to each of the priority bins 12 via a plurality of kill signal lines 66. Each of the kill signal lines 66 is fed from a different one of the OR gate output lines 42 in the RPS 4.

Figure 3:
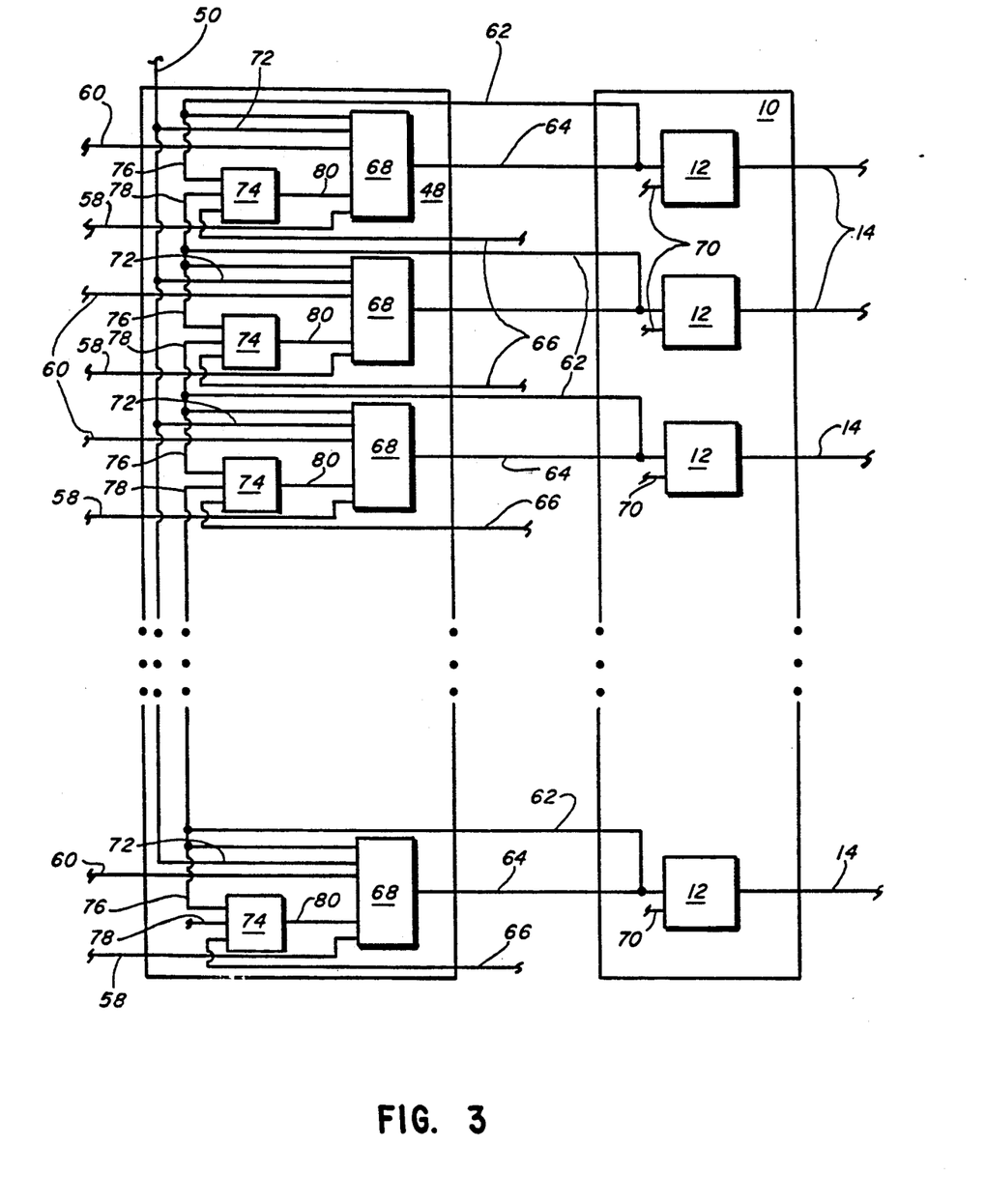
FIG. 3 is a block diagram for the bin shuffler shown in FIG. 1.

The bin shuffler 48 and the priority bin array 10 are shown in detail in FIG. 3. Each priority bin 12 in the priority bin array 10 comprises a storage register with its output fed on a corresponding one of the output lines 14 to the RPS 4. The input for each of the priority bins 12 is fed from the output of one of a plurality of four-to-one multiplexers 68 in the bin shuffler 48 via the bin shuffler output lines 64. Each one of the priority bins 12 also has a clock input for receiving a clock signal on a different one of a plurality of clock lines 70 for loading an RID value from bin shuffler 48.

Each of the multiplexers 68 has a first input for receiving the RID value stored in a corresponding one of the priority bins 12 via one of the lines 62. Each of the multiplexers 68 also has a second input for receiving the winning RID value from the last arbiter operation on the grant ID bus 8 via one of a plurality of winner RID lines 72 coupled to the bin shuffler input line 50. Each of the multiplexers 68 additionally has a third input for receiving one of the literal RID signals from the template array 52 via one of the lines 60.

The RID value received on the first input of each of the multiplexers 68 via one of the lines 62 is also fed to a first input of a corresponding one of a plurality of two-to-one multiplexers 74 via one of a plurality of first input lines 76 coupled to the lines 62. The RID value on each of the lines 62 is also fed via one of a plurality of second input lines 78 to a second input of each of the multiplexers 74 for the associated multiplexer 68 corresponding to the next highest priority bin 12 in the priority bin array 10. Each of the multiplexers 74 additionally has a select input fed by the kill signal on the one of the lines 66 for the corresponding one of the priority bins 12 in the priority bin array 10. The output of each of the multiplexers 74 is fed to a fourth input of its associated multiplexer 68 via one of a plurality of multiplexer output lines 80.

Each of the multiplexers 68 has a selector input fed from its own one of the bin shuffler command signal input lines 58. The command signal on this one of the lines 58 selects either the existing bin contents on the first input fed via an associated one of the lines 62, the RID of the winner of the previous arbiter on the second input via the associated one of the lines 72, a literal RID from the template array 52 via the associated one of the lines 60, or the output of the associated one of the multiplexers 74 on the corresponding one of the lines 80. The output of each of the multiplexers 74 on the corresponding one of the lines 80 represents the RID of the next lower priority one of the bins 12 if the kill signal on the line 66 is asserted. This indicates that the one of the priority bins 12 associated with the multiplexer 74 is at a lower or equal priority than the winner of the previous arbiter operation. Otherwise, the output of each of the multiplexers 74 on the corresponding one of the lines 80 represents the RID of the one of the priority bins 12 associated with the multiplexer 74.

Figure 4:
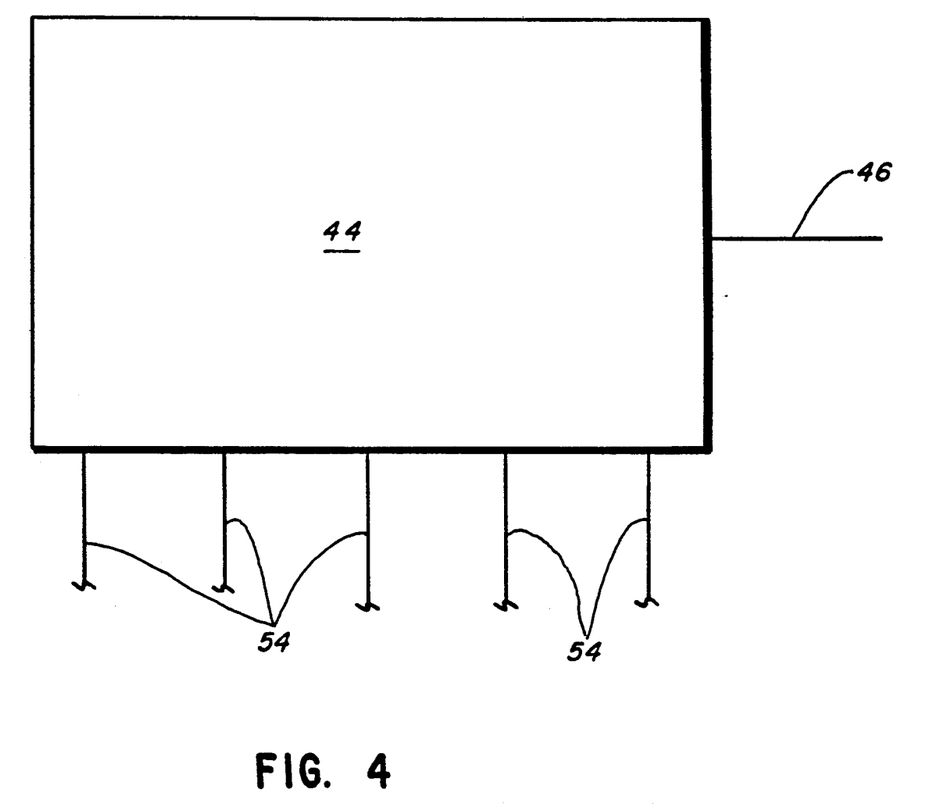
FIG. 4 is a block diagram of the template selector shown in FIG. 1.

The template selector 44 contains registers which provide a programmable means of selecting a particular one of the templates 56 in the template array 52 based on the winning RID of the previous arbiter operation. One of the templates 56 may be used to initialize the priority bin array 10 when desired. FIG. 4 shows the template selector 44 as comprising a random access memory (RAM) unit having an address input fed from the winning RID by the line 46. The template selector has a plurality of RAM outputs driving the template select lines 54.

The template selector 44 has as many addressable locations as there are RID's recognized by the arbiter system 2. The winning RID signal on the line 46 makes the template selector 44 select a particular word to be read from the RAM which it comprises. The template selector 44 then selects one of the templates 56 to be used to supply re-order commands to the bin shuffler 48. The RAM location in the template selector 44 may contain encoded template designations which are decoded externally, or it may contain an explicit bit map, in which case the template selector 44 has direct outputs on the lines 54 to directly select a template.

As one example of how the arbiter system 2 described above can be used, assume that the data processing system in which the arbiter system 2 is included has six requestors for the shared resource that the requestors all contend for. Also assume that the six requestors have the following RID's: 2, 3, 4, 5, 8 and 9, and that a fixed order request prioritization policy is to be used, with the RID's in descending order of priority to be 4, 2, 9, 5, 3 and 8. The programming for the template selector 44 and the templates 56 of the template array 52 is outlined in Table 2.

TABLE 2

| TEMPLATE SELECTOR PROGRAMMING | TEMPLATES Tmp 0 | Tmp 1 | INITIAL STATE OF PRIORITY BINS: | |
| --- | --- | --- | --- | --- |
| Winning RID ⟶ Template | L4 | NC | 0: | 4 |
| (any) ⟶ Tmp 0 - OR - | L2 | NC | 1: | 2 |
| Tmp 0 used for initialization, and | L9 | NC | 2: | 9 |
| (any) ⟶ Tmp 1 | L5 | NC | 3: | 5 |
| | L3 | NC | 4: | 3 |

TABLE 2-continued

| TEMPLATE SELECTOR PROGRAMMING | TEMPLATES Tmp 0 | Tmp 1 | INITIAL STATE OF PRIORITY BINS: | |
|---|---|---|---|---|
| | L8 | NC | 5: | 8 |
| | L0 | NC | 6: | 2 |
| | L0 | NC | 7: | 2 |
| | L0 | NC | 8: | 2 |
| | L0 | NC | 9: | 2 |

In Table 2, the template selector 44 is programmed to select the first of the templates 56 in the template array 52, labeled "Tmp 0", regardless of the winning RID on the grant RID output bus 8. Thus, the priority bins 12 of the priority bin array 10 will be loaded by the bin shuffler 48 with the literal RID values in ascending order of priority shown for Tmp 0. Alternately, the template selector 44 can be programmed to select Tmp 0 for initialization of RID priority, and then the template selector 44 will select a second one of the templates 56, labeled "Tmp 1", regardless of the winning RID on the grant RID output bus 8. Since Tmp 1 contains an "NC" command for each of its prioritization levels, the priority bins 12 of the priority bin array 10 are reloaded with the same RIDs by the bin shuffler 48 regardless of the winning RID on the grant ID output bus 8. Since the initial state of the priority bins 12 never changes, the arbiter system 2 always implements a fixed priority sequence in which the requestor with the RID 4 has the highest priority and the requestor with the RID 8 has the lowest priority.

As another example of how the arbiter system 2 described above can be used, assume that the data processing system in which the arbiter system 2 is included once again has six requestors for the same shared resource, the requestors having the same RID's as for the above-described example. In this case, the requestors with the RID's 2, 5 and 9 are the members of a first round-robin priority group, the requestor with the RID 4 has a higher priority than any members of the first round-robin group, and the requestors with the RID's 3 and 8 are the members of a second round-robin group with lower priority than any of the other requestors. The programming for the template selector 44 and the templates 56 of the template array 52 is outlined in Table 3.

TABLE 3

| TEMPLATE SELECTOR PROGRAMMING | TEMPLATES Tmp 0 | Tmp 1 | Tmp 2 | Tmp 3 | INITIAL STATE OF PRIORITY BINS: | |
|---|---|---|---|---|---|---|
| Winning RID →Template | L4 | NC | NC | NC | 0: | 4 |
| 4 →Tmp 1 | L2 | NC | N+1 | NC | 1: | 2 |
| 2,5,9 →Tmp 2 | L9 | NC | N+1 | NC | 2: | 9 |
| 3,8 →Tmp 3 | L5 | NC | W | NC | 3: | 5 |
| Tmp 0 used for initialization | L3 | NC | NC | N+1 | 4: | 3 |
| | L8 | NC | NC | W | 5: | 8 |
| | L0 | NC | x | x | 6: | 0 |
| | L0 | NC | x | x | 7: | 0 |
| | L0 | NC | x | x | 8: | 0 |
| | L0 | NC | x | x | 9: | 0 |

In Table 3, the template selector 44 is programmed to select the first of the templates 56 in the template array 52, labeled "Tmp 0", for initialization of the priority bins 12 in the priority bin array 10. Tmp 0 has the RID's literal value of 4, 2, 9, 5, 3 and 8 programmed in descending levels of priority for initialization. Tmp 0 commands the bin shuffler 48 to load the priority bins 12 of the priority bin array 10 with this same RID priority. The template selector 44 is also programmed to select a second template 56, labeled "Tmp 1", if the winning RID on the grant ID output bus 8 is 4. Tmp 1 contains a "NC" command for all of its prioritization levels, so that the prioritization does not change for the subsequent arbitration operation.

When the winning RID is 2, 5 or 9, the template selector 44 is programmed to select a third template 56, labeled "Tmp 2". Tmp 2 has "NC" commands in its first, fifth and sixth prioritization levels, so it does not command the bin shuffler 48 to change the priority of the RID 4 or the RID's 3 and 8. However, the fourth prioritization level in Tmp 2 is programmed with a "W" command, to command the bin shuffler 48 to load the winning RID in the fourth priority bin 12 of the priority array 10. The second and third prioritization levels of Tmp 2 contain "N+1" commands to command the bin shuffler 48 to load the corresponding priority bins 12 with the RID of the priority bin 12 with the next highest priority if the RID of the corresponding priority bin 12 is of lower or equal priority than the priority bin 12 with the winning RID.

When the winning RID is 3 or 8, the template selector 44 is programmed to select a fourth template 56 in the template array 52, labeled "Tmp 3". Tmp 3 has "NC" commands in its first through fourth prioritization levels, so it does not command the bin shuffler 48 to change the prioritization of the RID's 4, 2, 5 or 9. However, the sixth prioritization level in Tmp 3 is programmed with a "W" command, to command the bin shuffler 48 to load the winning RID in the sixth priority bin 12 of the priority bin array 10. The fifth prioritization level of TMP 3 contains the "N+1" command to command the bin shuffler 48 to load the RID of the sixth priority bin 12 into the fifth priority bin 12 if the RID of the fifth priority bin 12 is lower or the same as the RID in the sixth priority bin. Some re-ordering which can occur with this example is shown in Table 4.

"Tmp 3" in Table 2. Tmp 3 commands the bin shuffler 48 to load the RID 8 into the fifth priority bin 12 and to load the winning RID 3 into the sixth priority bin 12. Of course, if the requestor with the RID 4 wins, the template selector 44 selects Tmp 1, which does not change the prioritization of the RID's.

Thus, there has been described herein methodology and circuitry for providing adaptable dynamic prioritization of a plurality of requestors for data from a shared

TABLE 4

| INITIAL STATE OF PRIORITY BINS | RE-ORDERING IF RID 2 WINS ARB: | RE-ORDERING IF RID 5 WINS ARB: | RE-ORDERING IF RID 3 WINS ARB: |
| --- | --- | --- | --- |
| 0: 4 | 4 | 4 | 4 |
| 1: 2 | 9 | 9 | 9 |
| 2: 9 | 5 | 2 | 2 |
| 3: 5 | 2 | 5 | 5 |
| 4: 3 | 3 | 3 | 8 |
| 5: 8 | 8 | 8 | 3 |
| 6: 0 | 0 | 0 | 0 |
| 7: 0 | 0 | 0 | 0 |
| 8: 0 | 0 | 0 | 0 |
| 9: 0 | 0 | 0 | 0 |

In Table 4, assume that the requestor 2 wins arbitration. The template selector 44 selects Tmp 2, which contains commands for the first and second priority bins 12 to be loaded from the second and third priority bins 12, and contains a command to load the winning RID into the third priority bin 12. The rest of the priority bins 12 are commanded not to change. This implements a LRU round-robin prioritization of the RID's for the first, second and third prioritization level priority bins 12.

Next assume that blank the requester with the RID 5 wins, which causes the template selector 44 to again select Tmp 2. The RID 9 of the second priority bin 12 of the priority bin array 10 in this case remains unchanged even though the re-order command is "N+1", since this priority bin 12 has a priority level higher than the priority bin 12 with the winning RID. The third priority bin 12 is loaded by the bin shuffler 48 with the RID 2 from the fourth priority bin 12 as before, and the fourth priority bin 12 is loaded by the bin shuffler 48 with the winning RID 5. This effects a round-robin prioritization policy in the second, third and fourth priority bins 12, with the further optimization that an RID which has been elevated to the highest priority remains at highest priority because it has not used the contested resource.

Finally, assume that the requestor with the RID 3 wins, which causes the template selector 44 to select a fourth template 56 of the template array 52, labelled resource in a data processing system with a plurality of programmed prioritization commands selected according to the winning request of each arbiter operation. It will be understood that various changes in the details, arrangements and configuration of the parts and systems which have been described and illustrated above in order to explain the nature of the present invention may be made by those skilled in the art within the principle and scope of the present invention as expressed in the appended claims.

What is claimed is:

1. A programmable arbiter system for arbitrating a plurality of requests received from a plurality of requestors for a shared resource, each requester having a unique requestor identification (RID) which forms a portion of each request, comprising:
a priority bin array for storing said RIDs of said plurality of requestors, said priority bin array having a plurality of priority bins, each priority bin stores said RID for one of said requestors and corresponds to one of a plurality of priority levels in a RID prioritization order;
an array of storage registers for storing a plurality of groups of priority commands, each storage register storing one of said groups of priority commands, each of said groups of priority commands implements a corresponding arbitration priority algorithm, each priority command of each of said groups corresponds to one of said plurality of priority bins, each of said groups forming a priority template with said priority commands of each group arranged to form a RID prioritization pattern to implement said arbitration priority algorithm corresponding to each of said groups of priority commands;

a programmable random access memory having a plurality of addresses and being connected to said array of storage registers for selecting one of said groups forming said priority template for use as said RID prioritization pattern to implement said arbitration priority algorithm corresponding to said selected one of said groups, the number of said addresses being linearly scaled to the number of said requestors;

a bin shuffler connected to said array of storage registers and said priority bin array and responsive to said priority commands of each group for loading each priority bin according to said priority command of said selected one of said groups corresponding to said one of said plurality of priority bins being loaded to order said RIDs in said priority bin array according to said RID prioritization pattern;

a request prioritization and selection means for receiving a first plurality of requests from said plurality of requestors and responsive to the order of said RIDs in said priority bin array for selecting the RID of said requestors making said first plurality of requests with the highest priority level in accord with said RID prioritization order;

said programmable random access memory responsive to said selected RID with the highest priority level to select another one of said groups forming said priority template for use as a new RID prioritization pattern to dynamically implement said arbitration priority algorithm corresponding to said another one of said groups;

said bin shuffler responsive to said new RID prioritization pattern for reordering said RIDs in said priority bin array by loading each priority bin according to said priority command of said selected another one of said groups corresponding to said one of said plurality of priority bins being loaded; and said request prioritization and selection means receiving another plurality of requests from said requestors and responsive to said order of said RIDs in said priority bin array for selecting the RID of said requestors making said another plurality of requests with the highest priority in said RID prioritization order.

2. The programmable arbiter system as set forth in claim 1 wherein said arbitration priority algorithm is the least recently used algorithm.

3. The programmable arbiter system as set forth in claim 1 wherein said arbitration priority algorithm is a combination of the least recently used algorithm and the round robin algorithm.

4. The programmable arbiter system as set forth in claim 1 wherein said plurality of requestors are formed into at least two groups with each group having a separate arbitration priority algorithm and said bin shuffler responsive to a selected RID of said requestors making said first plurality of requests with the highest priority level to determine which one of said requestor groups will experience a change in the arbitration priority algorithm.

5. A method for arbitrating requests received from a plurality of requestors for a shared resource, each requestor having a unique requestor identification (RID) which forms a portion of each request, comprising the steps of:

(a) storing a plurality of groups of priority commands, each group having its priority commands arranged to form a RID prioritization pattern to implement an arbitration priority algorithm with each priority command of each group corresponding to one of a plurality of priority levels in a RID prioritization order;

(b) selecting a group of priority commands from said plurality of groups of priority commands for use as said RID prioritization pattern;

(c) storing the RIDs of each of said plurality of requestors in a plurality of priority locations with each priority location storing said RID and having said one of said plurality of priority levels in said RID prioritization order;

(d) ordering said stored RIDs in response to said selected group of priority commands of said RID prioritization pattern to implement said arbitration priority algorithm corresponding to said selected group of priority commands by performing each priority command of said selected group of priority commands upon said priority location having said one of said plurality of priority levels in said RID prioritization order corresponding to said priority command being performed;

(e) receiving a first plurality of requests from said requestors, each request having the unique requestor identification (RID) corresponding to said requestor;

(f) selecting the RID of said plurality of requestors making said first plurality of requests with the highest priority level in said RID prioritization order;

(g) selecting another group of priority commands from said plurality of groups of priority commands for use as a new RID prioritization pattern in response to said selected RID with the highest priority level with each priority command of said selected another group forming said new RID prioritization pattern to dynamically implement an arbitration priority algorithm corresponding to said selected another group of priority commands;

(h) reordering said RIDs in response to said new RID prioritization pattern by performing each priority command of said another selected group of priority commands upon said priority location having said one of said plurality of priority levels in said RID prioritization order corresponding to said priority command being performed;

(i) receiving another plurality of requests from said requestors, each request having the unique requestor identification (RID) corresponding to said requestor; and (j) repeating steps (f) through (h).

6. A system for arbitrating requests received from a plurality of requestors for a shared resource, each requestor having a unique requestor identification (RID) which forms a portion of each request, comprising:

means for storing a plurality of groups of priority commands, each group having its priority commands arranged to form a RID prioritization pattern to implement an arbitration priority algorithm with each priority command of each group corresponding to one of a plurality of priority levels in a RID prioritization order;

first means for selecting a group of priority commands from said plurality of groups of priority commands for use as said RID prioritization pattern;

means for receiving a plurality of requests from a corresponding plurality of requestors, each request having an RID corresponding to one of said plurality of requestors;

means for storing the RID of each requestor in a plurality of priority locations with each priority location storing said RID and having said one of said plurality of priority levels in said RID prioritization order;

means for ordering said RIDs in said storage means in response to said selected group of priority commands of said RID prioritization pattern to arrange said RIDs by performing each priority command of said selected group of priority commands upon said priority location having said one of said plurality of priority levels corresponding to said priority command being performed;

second means for selecting the RID of said requestors making said plurality of requests with the highest priority level in accord with said RID prioritization order;

said first selecting means responsive to said RID with the highest priority level for selecting another group of priority commands from said plurality of groups of priority commands for use as a new RID prioritization pattern to dynamically implement said arbitration priority algorithm corresponding to said selected another group of priority commands; and said ordering means responsive to said priority commands being used as said new RID prioritization pattern for reordering said RIDs in said plurality of priority locations of said storage means to arrange said RIDs by performing each priority command of said selected another group of priority commands upon said priority location having one of said plurality of priority locations corresponding to said priority command being performed.

7. A method for arbitrating requests received from a plurality of requestors for a shared resource, each requestor having a unique requestor identification (RID) which forms a portion of each request, comprising the steps of:

(a) storing a plurality of groups of priority commands with each priority command corresponding to one of a plurality of priority levels in a RID prioritization order, each group having its priority commands arranged to form a RID prioritization pattern to implement an arbitration priority algorithm corresponding to said group of priority commands;

(b) selecting a group of priority commands from said groups of priority commands for use in establishing an initial RID prioritization pattern;

(c) storing the RID of each of said requestors in a plurality of priority locations with each priority location storing said RID and having said one of said plurality of priority levels in said RID prioritization order;

(d) ordering said stored RIDs in response to said selected group of priority commands according to said RID prioritization pattern to implement an arbitration priority algorithm corresponding to said selected group of priority commands by performing each priority command of said selected group of priority commands upon said priority location having said one of said priority levels in said RID prioritization order corresponding to said priority command being performed;

(e) receiving a plurality of requests from said requestors, each request having the unique requestor identification (RID) corresponding to said requestor;

(f) selecting the RID of said plurality of received requests with the highest priority level in accord with said RID prioritization order;

(g) selecting, in response to the RID with the highest priority level, another group of priority commands from said plurality of groups of priority commands for use as a new RID prioritization pattern to dynamically implement said arbitration priority algorithm of said selected another group of priority commands;

(h) replacing said RID prioritization pattern with said new RID prioritization pattern; and (i) repeating steps (d) through (f).

* * * * *